Figure 1:
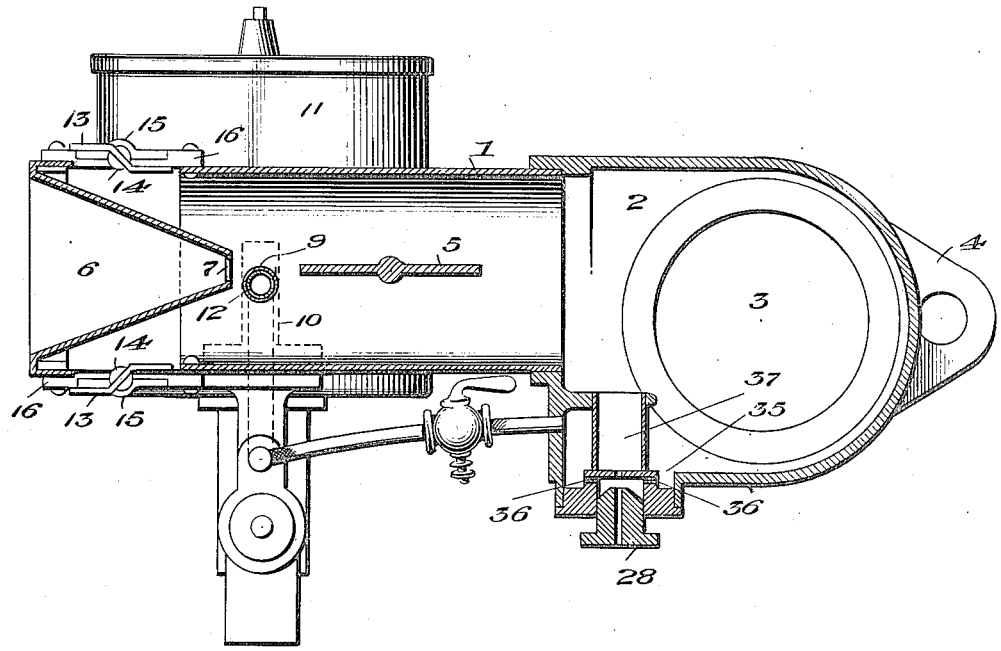

H. M. REICHENBACH.
FUEL SUPPLYING DEVICE FOR INTERNAL COMBUSTION ENGINES.
APPLICATION FILED JUNE 3, 1916.

1,254,355.

Patented Jan. 22, 1918.
3 SHEETS—SHEET 1.

Inventor
Henry M. Reichenbach
By Wilkinson, Ginsta & Mackaye
Attorney

H. M. REICHENBACH.
FUEL SUPPLYING DEVICE FOR INTERNAL COMBUSTION ENGINES.
APPLICATION FILED JUNE 3, 1916.
1,254,355.
Patented Jan. 22, 1918.
3 SHEETS—SHEET 2.
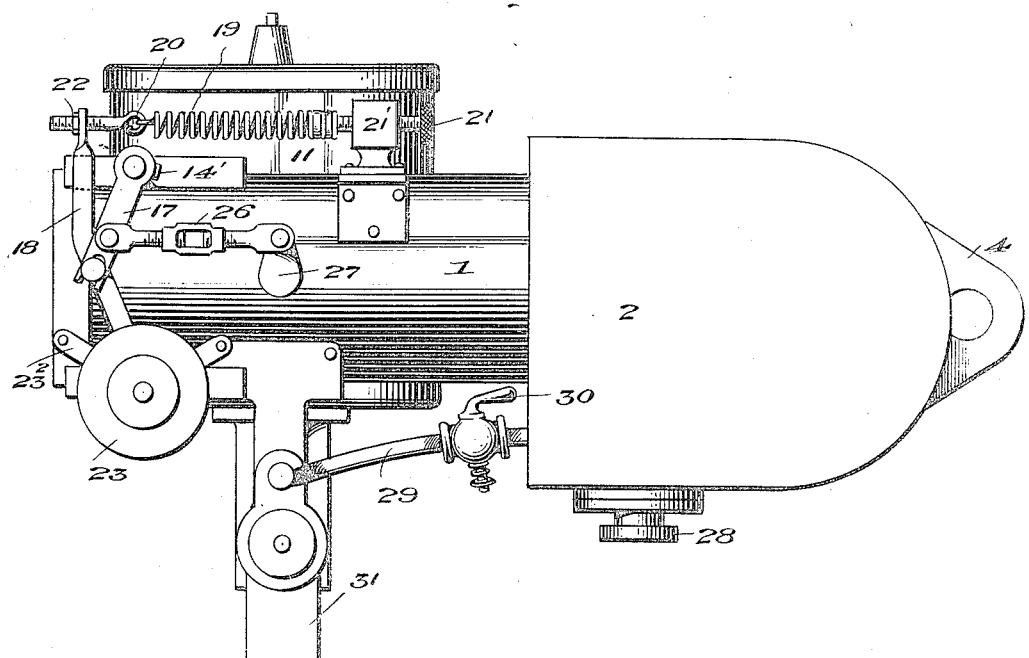
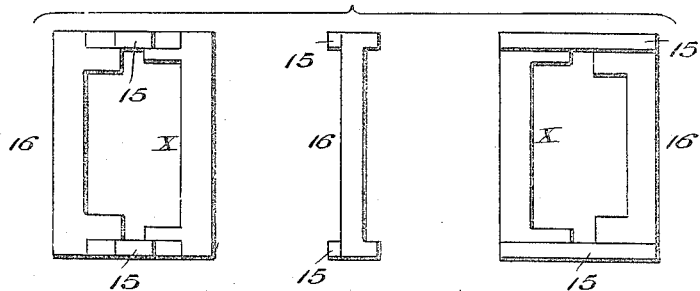
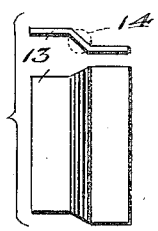
Henry M. Reichenbach.
Inventor
Witness
By Wilkinson, Ginsta, + MacKaye,
Attorneys

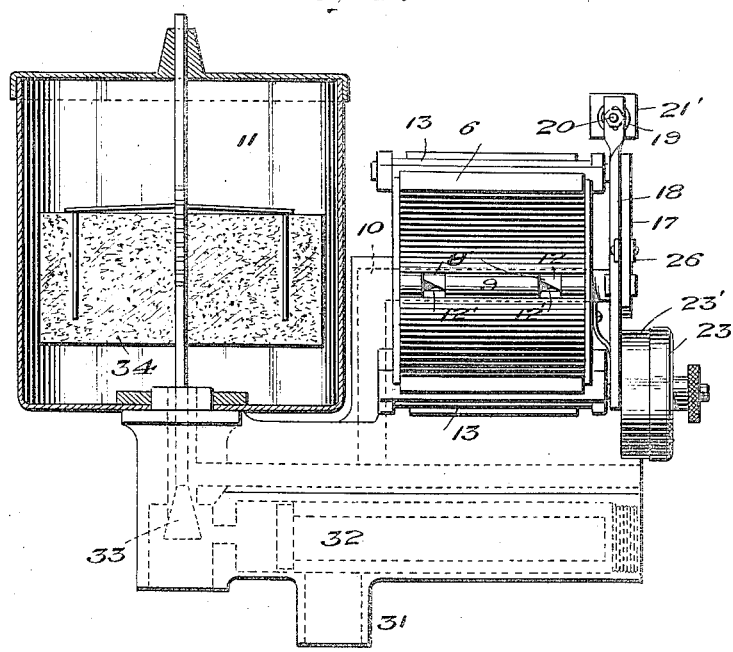
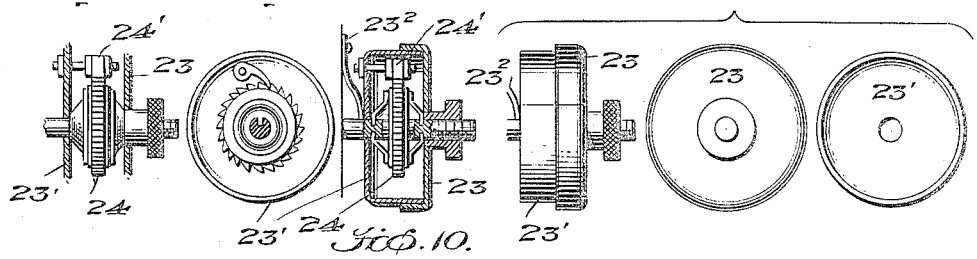
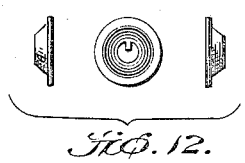

UNITED STATES PATENT OFFICE.

HENRY M. REICHENBACH, OF DETROIT, MICHIGAN.

FUEL-SUPPLYING DEVICE FOR INTERNAL-COMBUSTION ENGINES.

1,254,355. Specification of Letters Patent. Patented Jan. 22, 1918.

Application filed June 3, 1916. Serial No. 101,602.

*To all whom it may concern:*

Be it known that I, HENRY M. REICHENBACH, a citizen of the United States, residing at Detroit, in the county of Wayne and State of Michigan, have invented certain new and useful Improvements in Fuel-Supplying Devices for Internal-Combustion Engines, (Case "D;") and I do hereby declare the following to be a full, clear, and exact description of the invention, such as will enable others skilled in the art to which it appertains to make and use the same.

My invention relates to atomizers for internal combustion engines, and consists in certain improvements in the means for supplying auxiliary air into the intake conduits of such engines, a means for regulating supply of fuel to said conduits, in valves for controlling the admission of air through said auxiliary openings in said intake conduits, a means for establishing a controlling relation between the movement of said valves and movement of a valve controlling the fuel supply, and in means for regulating or steadying the movement of said air supply valves whereby the latter are prevented from moving so fast as to disturb the proportionate relation between the feed of air through the auxiliary air supply openings and the feed of fuel.

The valves for controlling the admission of air through the auxiliary supply openings are so mounted as to move in response to engine suction, and to maintain a comparatively steady position under engine suction, so that fluttering of said valves is, to a large extent, avoided.

I provide, as I have indicated above, for said valves, shafts so mounted as to rotate, and I provide these shafts, if I use more than one as I prefer to do, with interconnected levers, and place these levers under control of a light spring tending to hold the valves closed on the one side, and on the other side I connect said levers by an adjustable connection with a lever or crank on the shaft of the valve which controls the fuel supply.

I connect the shaft of one of said valves with a braking device which is adapted to slow down the opening movement of said valves, though not to interfere with their closing movement. This braking device prevents too sudden opening of the valves and admission of too much air, or, in other words, air in quantity out of proper proportion to the fuel admitted, since the fuel, on account of its inertia and because of the narrow openings and pipes, responds less promptly than air to the needs of service.

My invention relates to other details which may be brought out in the accompanying description and covered by the following claims.

Figure 2:
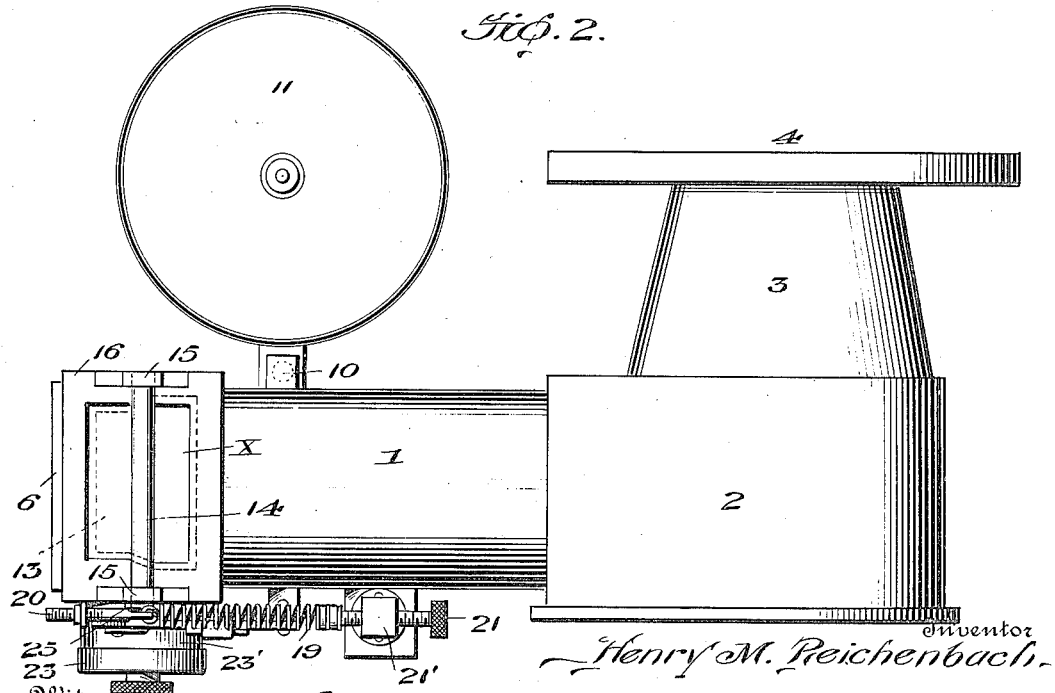

In the accompanying drawings:

Figure 1 is an elevation partly in section.
Fig. 2 is a plan view.
Fig. 3 is a side elevation.
Fig. 4 is a rear view partly in section.
Fig. 5 shows the mounting of the air valve in detail.
Fig. 6 shows the air valve in detail.
Fig. 7 shows the fuel feed tubes.
Figs. 8 to 12 show details of the retarding device.

Referring to Fig. 1, 1 is a casing feeding into a chamber 2 at right angles to the motor intake 3 which is connected by the flange 4 to the engine. Within the casing is a throttle valve 5, and the air deflector 6 here shown as a truncated wedge but which may have the form of a truncated cone or pyramid, or other suitable deflecting form, and which is provided with primary air supply openings 7, for the purpose of producing sharp jets of air across the fuel openings, in the horizontal fuel supply tube 9 which is connected at one end with a fuel supply tube 10. The fuel supply is controlled by the constant level tank 11, of the usual construction. The open ended tube 9 is provided with slots 8, and has within it, and concentric therewith, a tube 12 free to turn, which is cut away at places to produce triangular openings 12'. The rotation of this inner tube, which is free to turn, increases or diminishes the amount of fuel entering the casing 1 in proportion to the extent to which said openings 12' register with the slots 8 in the other tube 9. Fuel entering the open end of the inner rotatable tube passes through the triangular openings 12' and slots 8, to the conduit. Auxiliary or diluting air valves 13, 13, of novel construction, are shown. They are two-leaved valves and are mounted on shafts 14, 14, journaled in the bearings 15, 15 on the plates 16, 16.

Each valve 13 is two-winged, and consists of a sheet of metal made to pass through a slot in a shaft 14, and bent on either side of the shaft, into two parallel planes somewhat like a distorted Z, (see Fig. 1), one leaf adapted to lie upon and the other to lie beneath the plate 16, and closing the air opening in said plate, and, being able to turn from that closed position only in one direction (counter-clockwise in the lower valve shown in Fig. 1). Air seeking to enter at the opening closed by said valve, bears with equal force per square inch upon both leaves of said valve and the spring referred to below, tends to keep the valve in closed position. The area of the opening on the entrance side X, is somewhat larger than the area of the opening on the other side of shaft 14, and the difference in aggregate pressure tends, therefore, to cause the valve to open against tension of the holding spring 19. The area of the leaves, it will be noted, is also greater on one side of the shaft than upon the other; in other words, it is unbalanced. This entire construction tends to prevent, to a large extent, the flapping of the valves under intermittent engine suction.

These shafts 14 supporting the valves, are provided with interlocking or interengaging levers 17 and 18, and by means of the spring 19 the valves are retained in a closed position. The lever 17 is adjustable on the upper shaft 14 by set screw 14'. The lever 18 may also have angular or longitudinal adjustment on its shaft.

The spring supporting and controlling mechanism has novel features. A hook 20, threaded into a nut 22, is provided at one end which connects it with the lever 18; at the other end of the spring there is provided a threaded adjusting screw 21' passing through a post 21' fixed upon the wall of the intake conduit, the thread of this screw 21 being of the same pitch as the coil of the spring 19 where the rings of the coil are close together. By means of this the active length of the spring may be increased or diminished without changing the initial tension, as is very desirable in many devices. The effect of this is to change the ultimate tension on the valves in the open position; the initial tension is controlled or varied by turning the nut 22.

Another new feature, a retarding device 23, is provided, which prevents the too rapid opening of the air valves 13, 13, when the throttle valve is suddenly opened. If these valves open too rapidly the balance of the mixture of fuel and air is disturbed, owing to the inertia and greater resistance to the fuel in passing through the narrow feed slots. This device 23 is shown in detail in Figs. 8 to 12.

The shaft of the lower air valve passes through the casing 1 and through the circular compartment or casing 23', attached externally as shown in Fig. 3, by braces 23². Within this compartment, and attached to the lower valve shaft 14, which is slotted, are two disks 26 splined to the shaft. Between these disks and separated from them by thin sheets of friction material suffi-ciently absorbent to carry a lubricant, is a ratchet wheel 24 engaged by a pawl 24' attached to the casing of the compartment. It will be seen that upon the opening of the valve through the engagement of the pawl, the ratchet wheel is held stationary, and the valve can only open against the friction of the disks on either side of the ratchet wheel. This friction is varied by the thumb nut 25, which is threaded on the outer end of the lower shaft 14. It will be noted that by this arrangement, the valves are free to close under the action of the spring without this frictional resistance. The same shaft 14 carries the lever 18. A connection 26, adjustable, is provided between the arm 17 and the crank 27 on the end of the tube 12, whereby the fuel supply may be varied automatically in response to the movement of the air valves 13.

The mixture of air and atomized fuel feeds tangentially into the chamber 2; the coarser particles collecting on the inner wall and traveling downward, are caught by the re-atomizer 28 and projected again into the fuel current and subjected to the separatory tangential action, the minute particles or nebulized portion of the fuel passing into the motor and the heavier particles being subjected to re-subdivision.

29 is a fuel by-pass provided with a stop cock 30, which permits of fuel being supplied to the re-atomizer intermittently and under control of the operator for starting the motor. 31 is a connection whereby the fuel enters the apparatus passing through the filtering screen 32 to the check valve 33, which is under the control of the float 34 and maintaining the fuel under constant level in supply relation to the tube 9.

The air enters the chamber 2 on the side, i. e. tangentially, and this gives the mixture a helical or swirling motion in said chamber 2 and also in chamber 3, as will be evident.

The horizontal intake chamber 3, by its conical shape, aids in the collection of drip toward its larger end where it joins chamber 2, the flare extending downward. This drip drains into chamber 2, and thence into the collecting channel 35, whence it overflows through openings 36 into the smaller chamber 37 of the reatomizer 28. The centrifugal force of the swirl not only causes drops to be thrown out, but accelerates their movement along the sides of said intake chamber 3 toward the larger end. The same swirling motion has some tendency to compress the blast at the narrow end and squeeze out the larger particles, and at the same time give to the charge greater pressure and speed as it passes into the engine.

Having thus described my invention, what I claim as new and desire to secure by Letters Patent is:

1. In an atomizer for internal combustion engines, in combination, an air intake conduit, fuel feeding jets therein, means for feeding fuel to said jets, means for supplying air near to said jets, and means for providing an auxiliary air supply to said conduit, said last-named means consisting of a two-leaved Z-shaped valve, with leaves of unequal area.

2. In an atomizer for internal combustion engines, in combination, an air intake conduit having primary air supply openings, fuel feeding means leading to said conduit, pairs of auxiliary air supply openings of unequal size, two-leaved Z-shaped valves in said last named openings, a spring for holding said Z-shaped valves in position, and means whereby pressure on one leaf of each valve tends to open said valve and pressure on the other leaf to close it, the pressure on the former being the greater.

3. In an atomizer for internal combustion engines, in combination, an air intake conduit having pairs of auxiliary air supply openings of unequal size, two-leaved unbalanced Z-shaped valves in said openings, shafts on which said valves are mounted, interengaging levers mounted on said shafts, and a spring engaging one of said levers and adapted to hold said valves in closed position.

4. In an atomizer for internal combustion engines, in combination, an intake conduit provided with primary air supply openings, means for discharging fuel in advance of said openings, an auxiliary air supply opening, a Z-shaped, unbalanced valve pivoted on a shaft for controlling the admission of air through said opening, in response to engine suction, means mounted on said shaft for controlling movement of said valve, a device connecting said controlling means with the fuel discharge means, whereby the position of said valve controls the amount of fuel supply, and a retarding device connected to said shaft whereby movement of the valve is slowed down to an extent adapted to compensate for lag in the response of the fuel supply means to movement of the valve.

5. In an atomizer for internal combustion engines, in combination, an intake conduit, an opening for admitting air to said conduit, a shaft mounted double valve for closing said opening, a friction disk fast on said shaft, a ratchet loose on said shaft in contact with said disk, a casing in which said disk and ratchet are mounted fast to a wall of said conduit, and a pawl secured to said casing in engagement with the teeth of said ratchet whereby the valve is retarded by the friction between the ratchet wheel and disk in movement to open, but is free to move to closing position carrying with it the disk and ratchet.

6. In an atomizer for internal combustion engines, in combination, an intake conduit, an opening for admitting air to said conduit, a shaft mounted double valve, mounted to swing in one direction with both leaves to closing position and to swing in the other direction with both leaves in open position, one with and the other against draft pressure, the former being the larger, a casing secured to the conduit, the valve shaft extending into said casing, disks fixed on said shaft, a ratchet wheel movably mounted on said shaft between the disks, and a pawl in engagement with the teeth of said ratchet wheel, mounted on said casing, fuel supply means, and a connection between said fuel supply means and said shaft, whereby the opening of the valve in response to air pressure, is retarded to allow for lag in fuel feed in response to engine suction, but prompt closing of the valve, and corresponding diminution in fuel supply is permitted.

7. In an atomizer for internal combustion engines, in combination, an intake conduit, a rounded chamber connected tangentially with said conduit, and a conical chamber connected sidewise with the rounded chamber with its larger base next to said rounded chamber, whereby a swirling charge passes from one chamber to the other on its way to the engine and centrifugally separated fuel is collected and forced back against the draft, by centrifugal force upon the conical walls.

8. In an atomizer for internal combustion engines, in combination, a conduit, fuel supplying means opening into said conduit, said conduit provided with an opening, a valve closing said opening, a coiled spring mounted at one end to a wall of the conduit and being at the other in effective engagement with the valve, and having at one end means for varying the ultimate tension and at the other with independent means for varying initial tension.

9. In an atomizer for internal combustion engines, in combination, a conduit, fuel supplying means opening into said conduit, said conduit provided with an opening, a valve closing said opening, a coiled spring mounted at one end to a wall of the conduit and being at the other in effective engagement with the valve, and having at one end a screw whose threads are of the same pitch as the spring, engaging the interior of the spring, for varying its ultimate tension and at the other end with an independent nut and screw for stretching or slacking the spring to vary its initial tension.

In testimony whereof, I affix my signature.
HENRY M. REICHENBACH.